United States Patent [19]

Yoshikawa

[11] 4,408,207
[45] Oct. 4, 1983

[54] ANGULAR ERROR DETECTING DEVICE

[75] Inventor: Yoshihiko Yoshikawa, Itami, Japan

[73] Assignee: Mitsubishi Denki Kabushiki Kaisha, Tokyo, Japan

[21] Appl. No.: 295,294

[22] Filed: Aug. 24, 1981

[51] Int. Cl.³ .............................................. H04B 7/00
[52] U.S. Cl. .................................... 343/362; 343/420
[58] Field of Search ........................... 343/100 PE, 114

[56] References Cited

U.S. PATENT DOCUMENTS 3,836,973  9/1974  Shnitkin et al. .............. 343/100 PE
4,106,015  8/1978  Beguin et al. ................. 343/100 PE

OTHER PUBLICATIONS

J. S. Cook et al., *The Autotrack System*, Bell System Technical Journal, Jul. 1963.
L. J. Cooper, *A Frequency Reuse, Monopulse Tracking Feed for Cassegrain Antenna Applications*, 1980, IEEE Publication No. AP. 3-7.

*Primary Examiner*—Theodore M. Blum
*Attorney, Agent, or Firm*—Sughrue, Mion, Zinn, Macpeak and Seas

[57] ABSTRACT

An angular error detecting device in which all components of arriving polarized waves are obtained independent of the type and amount of polarization. A higher mode detector outputs two higher mode components which are in orthogonal relation. These two components are combined so as to maintain the orthogonal relation. A circuit is provided having a set of at least one 90° phase difference plate and one 180° phase difference plate which have rotatable phase lag surfaces and which are cascade-connected. The 90° phase difference plate is provided on the side of the circuit combining the two higher order components. The output of the 180° phase difference plate is divided into first and second orthogonal polarization components. The first polarization component is synchronously detected with a local oscillator output synchronous with reference signals to provide a first angular error output while the output of the second polarization component is synchronously detected with signals shifted 90° in phase from the local oscillator output to thereby provide a second angular error output orthogonal to the first angular error output.

7 Claims, 12 Drawing Figures

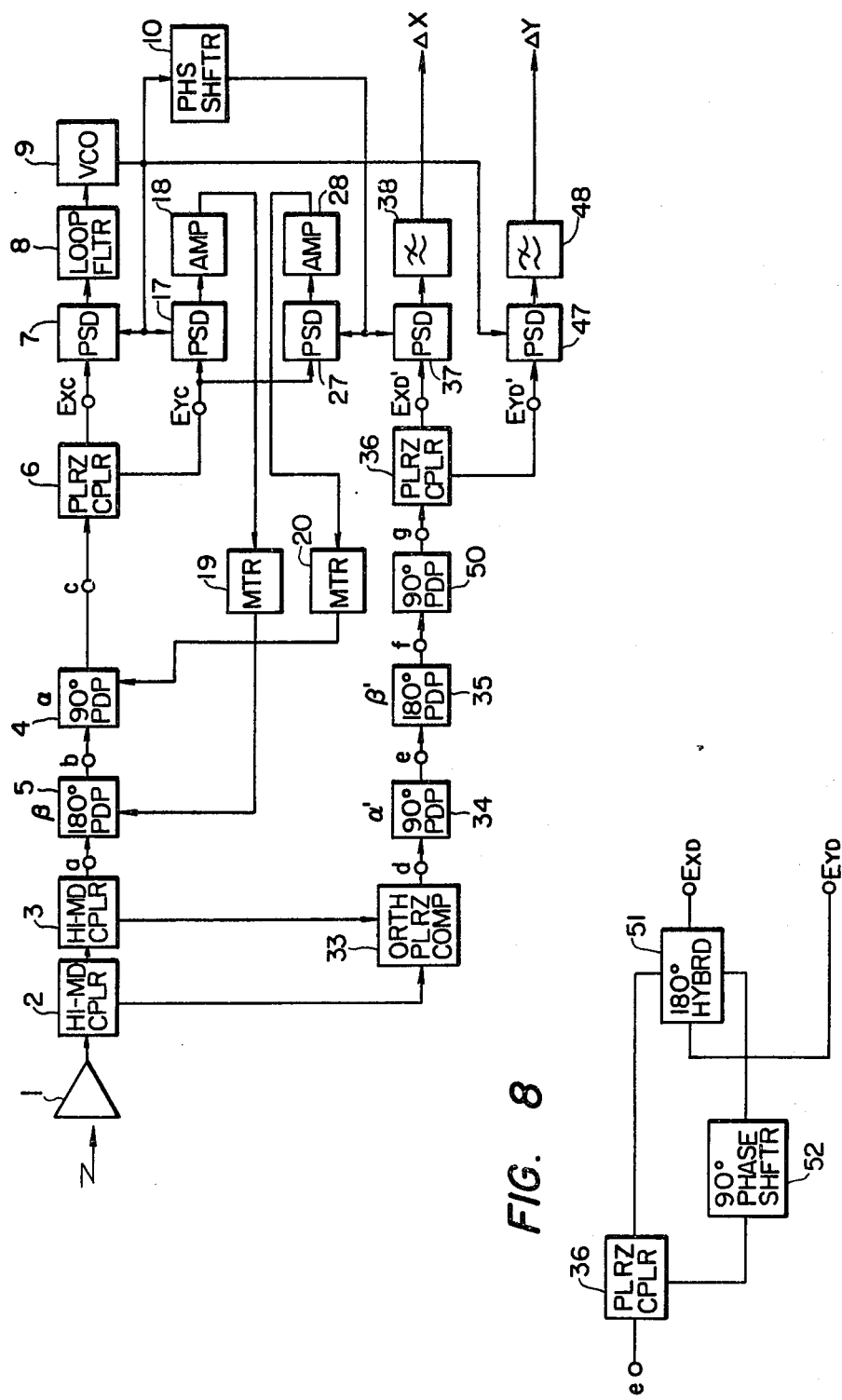

ANGULAR ERROR DETECTING DEVICE

BACKGROUND OF THE INVENTION

The present invention relates to an angular error detecting device utilizing an antenna for receiving radio signals from a target and in which the directional angular error between the direction of the antenna and the direction of the target is detected.

In the case where a polarized wave from a target has a constant polarization such as polarization or linear polarization, a simple method has been known in the art to detect the directional angular error and a variety of angular error detecting devices using this technique has been put to practical use. However, recently it has been required to provide an angular error detecting device which operates satisfactorily even in the case where a target emits or reflects waves which has a nonconstant polarization such as elliptical polarization or which have a polarization inclination which changes with time. This device is intended for use in a system of compensating cross polarization due to rain, etc. in the propagation path.

FIG. 1 shows an example of a conventional angular error detecting device of this type. In this device, a signal from a target is received by an antenna 1, and only a high order mode component excited in a circular waveguide is picked up by higher mode couplers 2 and 3. The higher mode couplers 2 and 3 are connected in an orthogonal relation. The couplers 2 and 3 are, for instance, a TE°$_{01}$ mode coupler and a TM°$_{01}$ mode coupler, respectively. The polarization configuration and polarization plane of the fundamental mode component are converted by polarization converters 4 and 5. In this example, the converters 4 and 5 are a 90° phase difference plate (PDP) and a 180° phase difference plate 5, respectively.

The signal subjected to polarization conversion is separated into two polarization components $E_{xc}$ and $E_{yc}$ which are orthogonal to each other by a polarization coupler 6. The component $E_{xc}$ is a main polarization component and the component $E_{yc}$ is an orthogonal polarization component. The component $E_{xc}$ is coupled to a phase locked loop (hereinafter referred to as "a PLL") at one input of a phase detector (hereinafter referred to as "a PSD") 7, a loop filter 8 and a voltage-controlled oscillator (hereinafter referred to as "a VCO") 9. The output of the VCO 9 is maintained different by 90° in phase from the component $E_{xc}$. On the other hand, the component $E_{yc}$ is subjected to detection by a PSD 17 using the output of the VCO 9 as a reference. The output of the VCO 17 is applied through an amplifier 18 to an electric motor 19 to drive the aforementioned polarization converter 5 and to drive the polarization converter 4 through a gear box 20.

The higher mode components from the higher mode couplers 2 and 3 are combined by an orthogonal polarization composer 33. The output of the composer 33 is applied through polarization converters 4 and 5 to a polarization coupler 36 where it is divided into two orthogonal components $E_{XD}$ and $E_{YD}$. These components are subjected to synchronous detection by PSD's 37 and 48 using the output of the VCO 9 directly and the output of the VCO 9 applied through a 90° phase shifter 10 as references. The outputs of the PSK's 37 and 38 are applied to low-pass filters 38 and 48 so that only dc components are obtained. As a result, two angular error voltages $\Delta X$ and $\Delta Y$ are provided.

The above-described operation will be further described using mathematical expressions.

FIG. 2 is a diagram showing relationships between a target, a tracking antenna with the angular error detecting device as described above and a polarized wave. In FIG. 2, reference character E designates the tracking antenna with the device and T the target. A coordinate system is used having as its origin the intersection of the central axis of the beam of the antenna and a plane including the target T. In FIG. 2, an angle $\Delta\theta$ between $\overrightarrow{EO}$ and $\overrightarrow{ET}$ is the angular error of the tracking antenna and a value $\phi$ is an angle corresponding to the orientation of the angular error and the inclination of the latter with respect to the X-axis. With respect to the configuration of arrived polarized waves as shown in FIG. 2, "$E_{max}$" and "$E_{min}$" represent the major axis electric field and the minor axis electric field of elliptical polarized waves respectively, and "$\gamma$" is the inclination of the direction of the electric field $E_{max}$ with respect to the X-axis.

In the case where the tracking antenna is provided with the angular error detecting device as shown in FIG. 1 under the conditions as shown in FIG. 2, the electric fields $E_{XA}$ and $E_{YA}$ at the input of the polarization converter 4 can be represented by the following expressions:

$$E_{XA} = E_{max} \cos\gamma - j E_{min} \sin\gamma$$

$$E_{YA} = E_{max} \sin\gamma + j E_{min} \cos\gamma. \tag{1}$$

The values $E_{XA}$ and $E_{YA}$ are the X component electric field and the Y component electric field at the point where the values $E_{XA}$ and $E_{YA}$ are determined after the X-Y coordinate in FIG. 2 is moved in the direction OE. The same is applicable to $E_{XB}$, $E_{YB}$, $E_{YC}$, $E_{XD}$ and $E_{YD}$. If the angles of the polarization converters 4 and 5 are represented by $\alpha$ and $\beta$, respectively, then $E_{XC}$ and $E_{YG}$ are:

$$E_{XC} = -E_{max} \sin(\alpha-2\beta) \sin(\alpha-\gamma) + E_{min} \cos(\alpha-2\beta) \sin(\alpha-\gamma) - jE_{max} \cos(\alpha-2\beta) \cos(\alpha-\gamma) + jE_{min} \sin(\alpha-2\beta) \cos(\alpha-\gamma)$$

$$E_{YC} = -E_{max} \cos(\alpha-2\beta) \sin(\alpha-\gamma) - E_{min} \sin(\alpha-2\beta) \sin(\alpha-\gamma) - jE_{max} \sin(\alpha-2\beta) \cos(\alpha-\gamma) + jE_{max} \cos(\alpha-2\beta) \cos(\alpha-\gamma). \tag{2}$$

In the case where the device shown in FIG. 1 receives a linearly polarized wave, the relation $\alpha=2\beta$ should be established by the gear box. In this case, control for $\alpha=\gamma$ is automatically carried out by the PSD 17, the amplifier 18 and the motor 19. In this operation, $$E_{XC} = -j E_{max}$$

$$E_{YC} = j E_{min}. \tag{3}$$

The angular error signals outputted by the higher mode couplers 2 and 3 are combined by the orthogonal polarization composer 33 into $E_{XB}$ and $E_{YB}$. These can be expressed as follows, when $\Delta\theta$ is small, $$E_{XB} = k\Delta\theta\{E_{max} \cos(\gamma-\phi) - j E_{min} \sin(\gamma-\phi)\}$$

$$E_{YB} = k\Delta\theta\{E_{max} \sin(\gamma-\phi) - j E_{min} \sin(\gamma-\phi)\}, \tag{4}$$

where k is a proportional constant.

The angles of the polarization converters 34 and 35 are the same as those of the polarization converters 4 and 5, i.e. $\alpha$ and $\beta$. Therefore, under the conditions $\alpha = 2\beta$ and $\alpha = \gamma$, the outputs $E_{YD}$ and $E_{YD}$ of the polarization coupler 36 are:

$$E_{XD} = k\Delta\theta\{E_{min}\sin\phi = j E_{max}\cos\phi\}$$

$$E_{YD} = k\Delta\theta\{E_{max}\sin\phi - j E_{min}\cos\phi\}. \quad (5)$$

Therefore, if only a component of the output $E_{XD}$, which is in phase with the output $E_{XC}$, is detected by PSD 37, the following expression (6) is obtained:

$$\Delta X = R\theta\left(\frac{E_{XD}}{E_{XC}}\right) = k\Delta\theta\cos\phi. \quad (6)$$

Similarly, if only a component of the output $E_{YD}$ which is orthogonal to $E_{XC}$ is detected by the PSD 47, then the following expression (7) is obtained:

$$\Delta Y = Im\left(\frac{-E_{YD}}{E_{XC}}\right) = k\Delta\theta\sin\phi. \quad (7)$$

The values $\Delta X$ and $\Delta Y$ given by the expressions (6) and (7) are components in the X direction and in the Y direction, respectively, of the angular error $\Delta\theta$, as is apparent from FIG. 2.

In the case where the device as shown in FIG. 1 is used to receive circularly polarized waves, the polarization converters 4, 5, 34 and 35 are not driven and $\alpha$ is set to $-\pi/4$ and $\beta$ is set to zero.

In this case, $$E_{XC} = \frac{1}{\sqrt{2}}(E_{max} + E_{min})\{\sin(\alpha - \gamma) - j\cos(\alpha - \gamma)\} \quad (8)$$

$$= \frac{-j}{\sqrt{2}}(E_{max} + E_{min})e^{j(\frac{\pi}{4} - \gamma)}$$

$$E_{XD} = \frac{-jk\Delta\theta}{\sqrt{2}}(E_{max} + E_{min})e^{j(\frac{\pi}{4} - \gamma - \phi)}. \quad (9)$$

Therefore, $$E_{XD}/E_{XC} = k\Delta\theta e^{-j\phi} = k\Delta\theta(\cos\phi - j\sin\phi). \quad (10)$$

Detecting $E_{XD}$ with the PSD 37 and the PSD 47 with $E_{XC}$ as a reference, $$\Delta X = Re\frac{E_{XD}}{E_{XC}} = k\Delta\theta\cos\phi \quad (11)$$

$$\Delta Y = Im\frac{-E_{XD}}{E_{XC}} = k\Delta\theta\sin\phi$$

are obtained.

In this case, the armature of a switch 41 in FIG. 1 is connected as shown, and in the case of a linearly polarized wave, the armature is set to the $E_{YD}$ side.

As is apparent from the above description, in the system shown in FIG. 1, the angular error voltages X and Y are obtained by suitably switching the angular error detecting circuit according to the conditions of received polarized waves. However, the circuits in the device in FIG. 1 must be switched separately according to whether circularly polarized waves or linearly polarized waves are being received. That is, the device is disadvantageous in that, when polarization of the arriving waves alters quickly, not only the operation becomes intricate, but also it is difficult to maintain signal reception satisfactorily. In other words, the device suffers from a drawback in that all the components of arrived polarized waves cannot be obtained for $E_{XC}$. For instance, if a counterclockwise circularly polarized wave arrives while the device is receiving a clockwise circular polarized wave, then $E_{XC} = 0$ occurs ($E_{max} = -E_{min}$ in the expression (8)). In this case, the device may not be able to receive the signal.

SUMMARY OF THE INVENTION

The invention is intended to eliminate the abovedescribed difficulties accompanying a conventional angular error detecting device.

More specifically, an object of the invention is to provide an angular error detecting device in which the polarization converters are suitably controlled for any arriving polarized wave, and the effects of angular error signal control are eliminated, whereby signal reception is maintained satisfactory and stable angular error voltages are provided.

Specifically, the invention provides an angular error detecting device in which reference signals are obtained from fundamental mode components in a waveguide which passes a first of at least one 180° phase difference plate and at least one 90° phase difference plate, the phase lag surfaces of which are disposed so that a polarization loss of a unit adapted to receive waves from a target is minimized. Angular error signals are obtained utilizing two higher mode components which are orthogonal one another, and the angular error signals are subjected to synchronous detection using a local oscillator output synchronous with the reference signals to thereby detect orthogonal angular errors.

In accordance with one aspect of the invention, a circuit for obtaining the angular error signals includes at least higher mode detector means for obtaining the two higher mode components which are in orthogonal relation, a circuit for combining the two higher mode components, a circuit having a second set of at least one 90° phase difference plate and one 180° phase difference plate which have rotatable phase lag surfaces and are cascade-connected. The 90° phase difference plate in the second set is provided on the side of the circuit for combining the two higher order components. The phase lag surface of the 90° phase difference plate of the second set is disposed in an angular ratio of 2:1 with respect to the phase lag surface of the 180° phase difference plate of the first set while the phase lag surface of 180° phase difference plate of the second set is disposed in an angular ratio of 1:1 with respect to the phase lag surface of the 180° phase difference plate of the first set. The output of the 180° phase difference plate of the second set is divided into first and second polarization components which are orthogonal to each other. The first polarization component is subjected to synchronous detection with the local oscillator output which is synchronous with the reference signal to produce a first angular error output and the second polarization component is subjected to synchronous detection with a signal shifted in phase 90° with respect to the local oscillator output to thereby provide a second angular error output which is orthogonal to the first angular error output.

In accordance with another aspect of the invention, a circuit for obtaining the error signals includes at least higher mode detector means for obtaining the two higher mode components which are in orthogonal relation, a circuit for combining the two higher mode components such that they are in orthogonal relation, and at least one second 180° phase difference plate. A phase lag surface of the second 180° phase difference plate is disposed in an angular ratio of 1:1 with respect to the phase lag surface of the first 180° phase difference plate. The output of the second 180° phase difference plate is divided into first and second polarization components which are orthogonal to each other. The first polarization component is detected synchronously with the local oscillator signal output synchronous with the reference signals to provide a first angular output while the second polarization component is synchronously detected with a signal shifted 90° phase from the output of the local oscillator to provide a second angular error output which is orthogonal to the first angular error output.

BRIEF DESCRIPTION OF THE DRAWINGS

FIGS. 8 and 9 and 10 are block diagrams showing other preferred embodiments of angular error detecting devices according to the invention.

DESCRIPTION OF THE PREFERRED EMBODIMENTS

Figure 1:
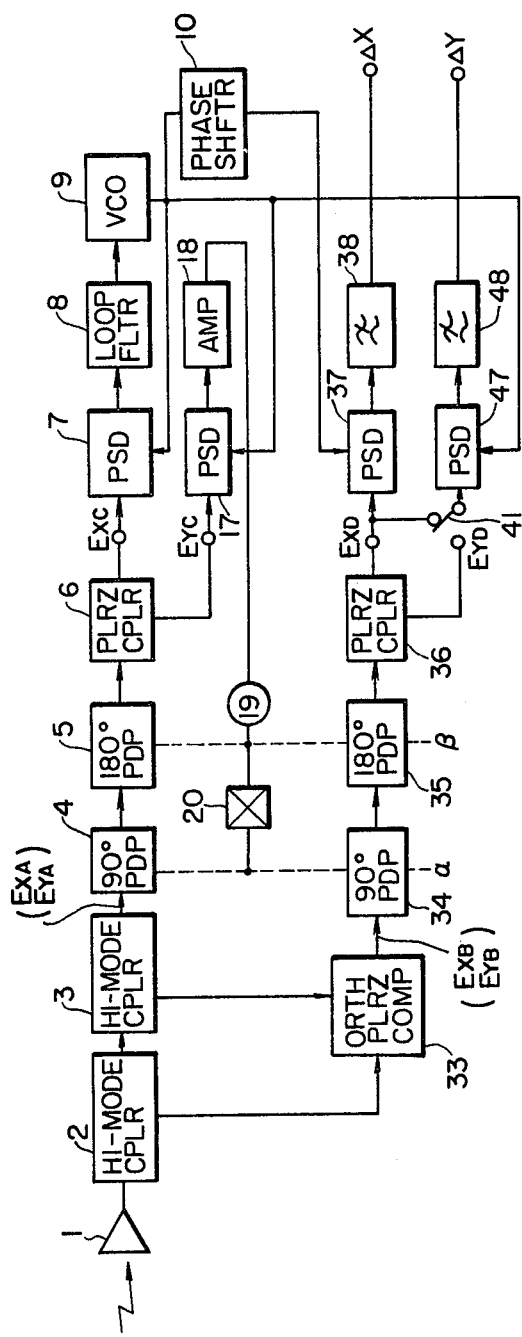
FIG. 1 is a block diagram showing an example of a conventional angular error detecting device.

A first preferred embodiment of an angular error detecting device according to the invention will be described with reference to FIG. 3. Circuit elements having the same reference numerals as those in FIG. 1 have the same functions.

The fundamental mode components are obtained at the terminal $E_{XC}$. To accomplish this, a PLL is formed and a signal having a phase difference of 90° is obtained as the output of the VCO 9 in synchronization with $E_{XC}$.

In accordance with the invention, the outputs of PSD's 17 and 27 are applied through amplifiers 18 and 28 to electric motors 19 and 21 to control the rotations of the lagging surfaces (hereinafter referred to as "phase lag surfaces") of the 90° phase difference plate 4 and the 180° phase difference plate 5 in such a manner that the cross polarization terminal output $E_{YC}$ of the polarization coupler is minimized when a polarized wave arrives, whereby a reference signal $E_{XC}$ having a reduced polarization loss is obtained.

The operating principle of the circuitry in FIG. 3 will be described.

In order to simplify the above-described general expressions (2) for $E_{XC}$ and $E_{YC}$, an assumption is made as follows:

$$E_{max} = E \cos \delta$$
$$E_{min} = E \sin \delta. \quad (12)$$

Then, $$E_{XC} = E\{-\sin(\alpha-\gamma)\sin(\alpha-2\beta-\delta) - j\cos(\alpha-\gamma)\cos(\alpha-2\beta+\delta)\}$$

$$E_{YC} = E\{-\sin(\alpha-\gamma)\cos(\alpha-2\beta-\delta) + j\cos(\alpha-\gamma)\sin(\alpha-2\beta+\delta)\}. \quad (13)$$

In the expressions (13), $E_{YC}$ is obtained with $E_{XC}$ as a reference. Then, the following expression (14) is obtained:

$$\frac{E_{YC}}{E_{XC}} = \frac{-\cos 2(\alpha-2\beta)\sin 2\delta - \sin 2(\alpha-2\beta)}{2\{\sin^2(\alpha-\gamma)\sin^2(\alpha-2\beta-\delta)} \quad (14)$$

$$\frac{\cos 2\delta \cos 2(\alpha-\gamma) - j\sin 2(\alpha-\gamma)\cos 2}{-\cos^2(\alpha-\gamma)\cos^2(\alpha-2\beta-\delta)\}}.$$

One of the conditions for the imaginary part of the expression (14) to become zero is for $\alpha=\gamma$. In FIG. 3, $E_{YC}$ is detected with the output of the VCO 9, which is different by 90° in phase from $E_{XC}$ in the PSD 17. With the polarization converter 4 driven by the motor so that the output is zeroed, then the condition is satisfied. With $\alpha=\gamma$, the expression (14) can be rewritten as follows:

$$\frac{E_{YC}}{E_{XC}} = \frac{-\sin 2(\alpha-2\beta+\delta)}{2\{\sin^2(\alpha-\gamma)\sin^2(\alpha-2\beta-\delta) + \cos^2(\alpha-\gamma)\cos^2(\alpha-2\beta-\delta)\}}. \quad (15)$$

Therefore, if $E_{YC}$ is detected with the output of the VCO 9 which has a phase difference of 90° by the phase shifter 10, i.e. a signal in phase with $E_{XC}$ in the PSD 27, and the polarization converter 5 is driven by the motor 21 so that the detection output is zeroed, then the condition $\alpha-2\beta+\delta=0$ which zeroes the expression (15) is obtained.

When two conditions $\alpha=\beta$ and $\alpha-2\beta+\delta=0$ are met, then $E_{XC} = -jE$, and the fundamental mode components of the arrived wave are all obtained at the terminal $E_{XC}$. It is evident that $E_{YC}$ is zero. Thus, when an arbitrarily polarized wave arrives, all of the fundamental mode components are obtained at the terminal $E_{XC}$, thus eliminating the drawbacks of the conventional system.

On the other hand, if the angles of the 90° phase difference plate 34 and the 180° phase difference plate 35 in the angular error signal circuit are made equal to those of the 90° phase difference plate 4 and the 180° phase difference plate 5 in the reference signal circuit, respectively, then it is difficult to obtain angular error signals with respect to a target in the case of an arbitrarily polarized wave. Therefore, the 90° phase difference plate 34 and the 180° phase difference plate 35 are placed in a particular angular relation as described below so as to automatically track an arbitrarily polarized wave.

Figure 2:
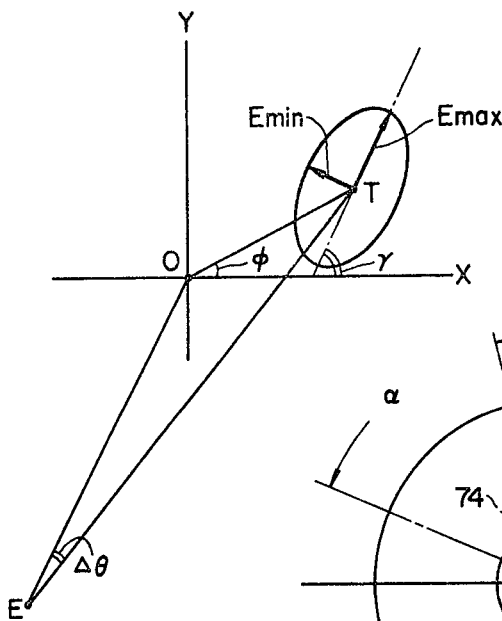
FIG. 2 is an explanatory diagram showing the positional relationships between a target and an antenna provided with such an angular error detecting device for a description of the operation of an angular error detecting device of the invention.
Figure 4:
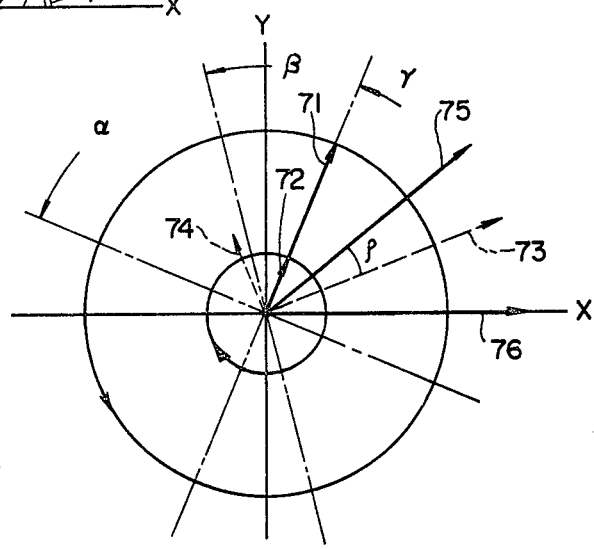
FIGS. 4 and 5 are explanatory diagrams showing relations in polarization between reference signals for a description of the operation of the device of the invention.
Figure 3:
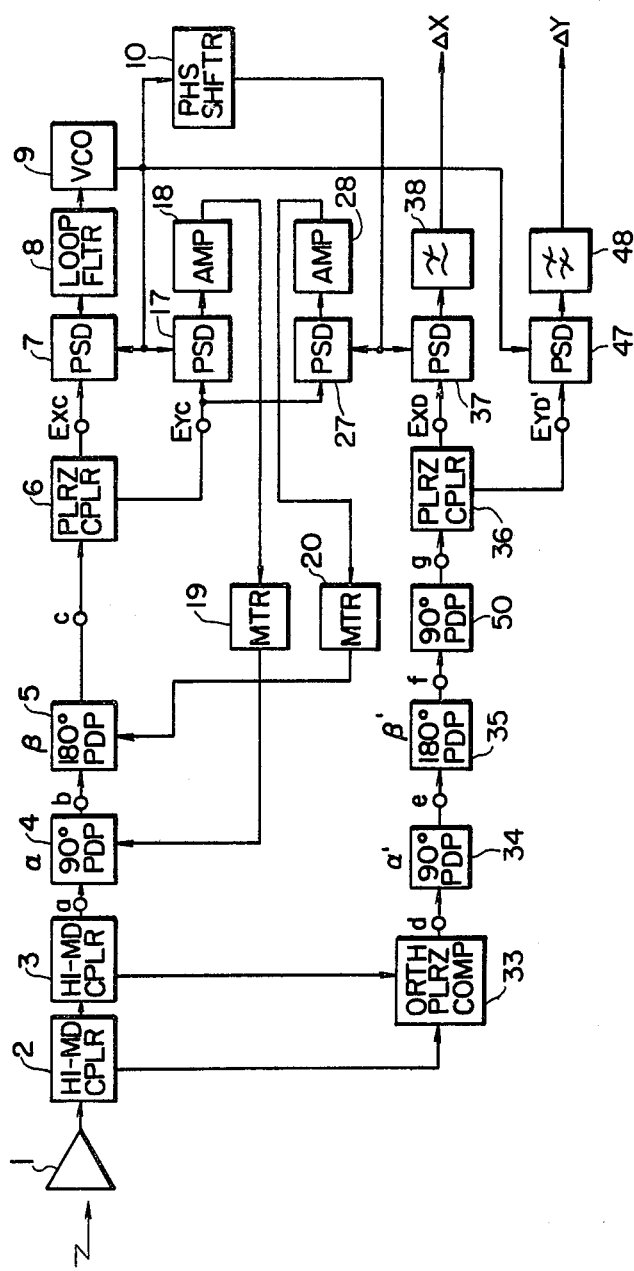
FIG. 3 is a block diagram of a first preferred embodiment of an angular error detecting device of the invention.

The polarized wave in FIG. 2 is maintained unchanged even at the point a in FIG. 3. FIG. 4 shows an elliptically polarized wave at the point a which is decomposed into a circularly polarized wave of counterclockwise rotation 71 (hereinafter referred to as "a CCW circularly polarized wave 71") and a circularly polarized wave of clockwise rotation 72 (hereinafter referred to as "a CW circularly polarized wave 72").

If in FIG. 4 the electric field of the CCW circularly polarized wave 71 is represented by $E_{1a}$ and the electric field of the CW circularly polarized wave 72 is represented by $E_{2a}$, then at the angle $\gamma$ from the X-axis, $$E_{1a} = E_1$$

$$E_{2a} = E_2, \tag{16}$$

where $$E_1 = (E_{max} + E_{min})/2$$

$$E_2 = (E_{max} + E_{min})/2. \tag{17}$$

If the set angle (phase lag surface) $\alpha$ of the 90° phase difference plate 4 is:

$$\alpha = \gamma + 90°, \tag{18}$$

then the polarization state at the point b is such that the CCW circularly polarized wave 71 and the CW circularly polarized wave 72 are converted into a linearly polarized wave $E_{1b}$ as indicated at 73 and a linearly polarized wave $E_{2b}$ as indicated at 74, respectively, $$E_{1b} = \sqrt{2} \, E_1 \tag{19}$$

$$E_{2b} = \sqrt{2} \, E_2 .$$

As the waves 73 and 74 are in phase, the composite wave 75 thereof is a linearly polarized wave. If the composite wave 75 is represented by $E_{\epsilon b}$, then $$E_{\epsilon b} = \sqrt{2(E_1^2 + E_2^2)} . \tag{20}$$

The angle of inclination $\tau$ from the X-axis is:

$$\tau = \gamma - 45° + \rho, \tag{21}$$

where $$\rho = \tan^{-1}\left(\frac{E_2}{E_1}\right) . \tag{22}$$

If the set angle $\beta$ of the 180° phase difference plate 5 is:

$$\beta = \frac{1}{2}\tau + 90° \left( \text{or, } \beta = \frac{1}{2}\left[\gamma - 45° + \right.\right. \tag{23}$$

$$\left.\left. \tan^{-1}\left(\frac{E_{max} - E_{min}}{E_{max} + E_{min}}\right)\right] + 90°\right) ,$$

then the polarized wave at the point c will be a linearly polarized wave propagating along the X-axis as indicated at 76.

Figure 5:
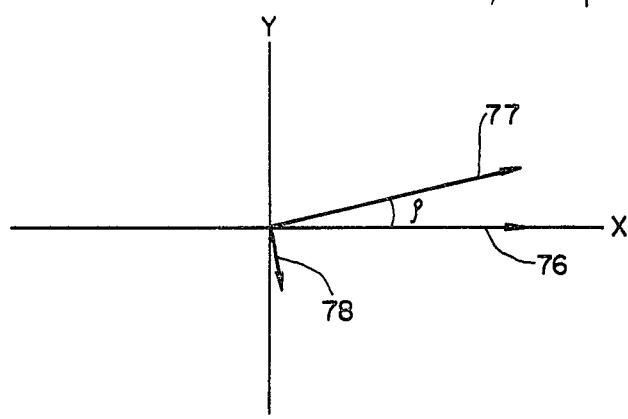

FIG. 5 shows the polarization conditions of the CCW circularly polarized wave 71 and the CW circularly polarized wave 72 at the point c. The waves 71 and 72 are converted into waves 77 and 78, respectively, and the composite wave 76 thereof is a linearly polarized wave propagating along the X-axis. If the composite wave 76 is represented by $E_\epsilon$, then $$E_\epsilon = \sqrt{2(E_1^2 + E_2^2)} \tag{24}$$

$$= \sqrt{E_{max}^2 + E_{min}^2} .$$

$E_\epsilon$ is an angular reference signal and is equal to $E_{XC}$.

Figure 6:
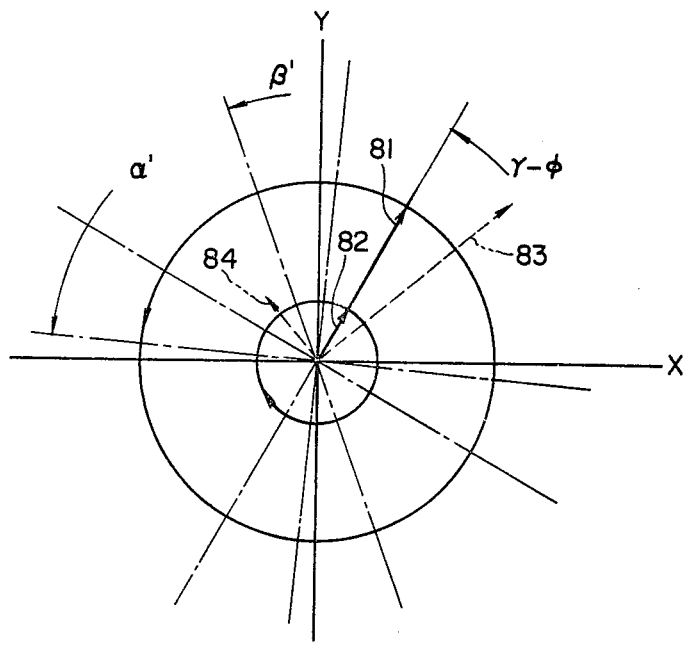
FIGS. 6 and 7 are explanatory diagrams showing relations in polarization between error signals.

Higher mode components orthogonal to each other are detected by the high mode couplers 2 and 3, respectively, and are then subjected to orthogonal polarization composition in the orthogonal polarization composer 33, as a result of which a polarized wave is obtained which is decomposed into a CCW circularly polarized wave $E_{1d}$ as indicated at 81 in FIG. 6 and a CW circularly polarized wave $E_{2d}$ as indicated at 82. That is, reference numerals 81 and 82 designate the polarized waves at the point d. At an angle $(\gamma - \phi)$ from the X-axis, $$E_{1d} = k\Delta\theta E_1$$

$$E_{2d} = k\Delta\theta E_2. \tag{25}$$

If the set angle $\alpha$ of the 90° phase difference plate 34 is:

$$\alpha' = \alpha + \rho, \tag{26}$$

then at the point e the waves 81 and 82 are converted into linearly polarized waves $E_{1e}$ and $E_{2e}$ as indicated at 83 and 84, respectively. The waves $E_{1e}$ and $E_{2e}$ have phases and amplitudes as indicated by the following expressions (27):

$$E_{1e} = \sqrt{2} \, E_{1d} \, e^{-j(\phi+\rho)} \tag{27}$$

$$= \sqrt{2} \, k \, \Delta\theta \, E_1 \, e^{-j(\phi+\rho)}$$

$$E_{2e} = \sqrt{2} \, E_{2d} \, e^{-j(\phi+\rho)}$$

$$= \sqrt{2} \, k \, \Delta\theta \, E_2 \, e^{j(\phi+\rho)}$$

These waves are applied to the 180° phase difference plate 35 set at an angle $\beta'$.

Figure 7:
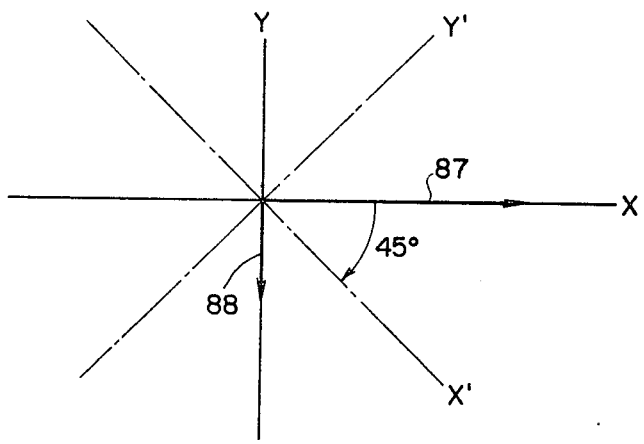

If $\beta' = \beta$, then the polarization conditions at the point f are as shown in FIG. 7. In FIG. 7, reference numerals 87 and 88 designate waves which are obtained by subjecting the waves 83 and 84 to conversion by the 180° phase difference plate 35. If these waves 87 and 88 are represented by $E_{1f}$ and $E_{2f}$, then $$E_{1f} = E_{1d} = \sqrt{2}\, k\, \Delta\theta\, E_1\, e^{-j(\phi+\rho)} \tag{28}$$

$$E_{2f} = E_{2d} = \sqrt{2}\, k\, \Delta\theta\, E_2\, e^{-j(\phi+\rho)}. \tag{29}$$

If the 90° phase difference plate 50 is set at 90°, then at the point g, $$E_{1g} = E_{1f} = \sqrt{2}\, k\, \Delta\theta\, E_1\, e^{-j(\phi+\rho)} \tag{30}$$

$$E_{2g} = E_{2f} e^{-j\frac{\pi}{2}} = \sqrt{2}\, k\, \Delta\theta\, E_2\, e^{j(\phi+\rho-\frac{\pi}{2})}. \tag{31}$$

$E_{1g}$ and $E_{2g}$ represent linearly polarized waves which propagate on the X-axis and the Y-axis, respectively. Therefore, if wave separation is effected by inclining the polarization coupler 36 by 45° in such a manner as to satisfy the following expressions (32) and (33)

$$E_{XD} = \frac{1}{\sqrt{2}} (E_{1g} + E_{2g}) \tag{32}$$

$$E_{YD} = \frac{1}{\sqrt{2}} (E_{1g} + E_{2g}), \tag{33}$$

then $$E_{XD} = k\, \Delta\theta\, \sqrt{E_1^2 + E_2^2}\, \cos\phi \tag{34}$$

$$-j\, k\, \Delta\theta\, \frac{1}{\sqrt{E_1^2 + E_2^2}}\, [(E_1^2 - E_2^2)\sin\phi - 2E_1E_2\cos\phi]$$

$$E_{YD} = k\, \Delta\theta\, \frac{1}{\sqrt{E_1^2 + E_2^2}}\, [(E_1^2 - E_2^2)\cos\phi - 2E_1E_2\sin\phi] \tag{35}$$

$$-j\, k\, \Delta\theta\, \sqrt{E_1^2 + E_2^2}\, \sin\phi.$$

When the real part of the expression (34) of $E_{XD}$ is detected by the PSD 37 and is applied to the low-pass filter 38, then $\Delta X$ as indicated by the following expression (36) can be obtained:

$$\Delta X = Re\left(\frac{E_{XD}}{E_\epsilon}\right) = \frac{k}{\sqrt{2}}\, \Delta\theta\, \cos\phi \tag{36}$$

Similarly, with the real part of the expression (35) of $E_{YD}$ detected by the PSD 47 and applied to the low-pass filter 48, then $\Delta Y$ as indicated by the following expression (37) is obtained:

$$\Delta Y = Im\left(\frac{E_{YD}}{-E_\epsilon}\right) = \frac{k}{\sqrt{2}}\, \Delta\theta\, \sin\phi. \tag{37}$$

That is, the expression (36) describes a control signal indicating an amplitude proportional to $\cos\phi$ in the case of an antenna directional error direction $\phi$, while the expression (37) describes a control signal indicating an amplitude proportional to $\sin\phi$. That is, the expressions (36) and (37) provide control signals indicating amplitudes proportional to X- and Y-direction errors, respectively.

In the expression (26), $\rho$ is $$\rho = 2\beta - \gamma - 135°, \tag{38}$$

where $\alpha$ is indicated by the expression (18) and $\beta$ is indicated by the expressions (23) and (21). Therefore, the set angle $\alpha'$ of the 90° phase difference plate 34 is:

$$\alpha' = 2\beta - 45°. \tag{39}$$

Thus, by setting the angle of the 90° phase difference plate 34 at twice the angle of the 180° phase difference plate 5 and by setting the 180° phase difference plate so as to have a rotation angle relation of 1:1 with the 180° phase difference plate 5, the signals indicated by the expressions (36) and (37) are obtained.

The stationary 90° phase difference plate 50 and the polarization coupler 36 in FIG. 3 act as a so-called circularly polarized wave generator forming an angle of 45° therebetween. Instead of this arrangement, an arrangement as shown in FIG. 8 may be employed to achieve the same object. In FIG. 8, reference numeral 36 designates a polarization coupler, 51 a 180° hybrid a typical example of which is a magic T'', and 52 a 90° phase shifter.

If, in the above-described example shown in FIG. 3, the 90° phase difference plate 34 and the 180° phase difference plate 35 in the angular error signal circuit are set at angles as described below, then the stationary 90° phase difference plate 50 can be eliminated.

The stationary 90° phase difference plate 50 has a function of causing the polarization component 78 to lag by 90°. Therefore, if the 90° phase difference plate 34 in FIG. 3 is turned through an angle which is larger by 45° than the angle indicated by the expression (26) or (39), i.e. $\alpha$ is $$\alpha = 2\beta, \tag{40}$$

then the components $E_{1e}$ and $E_{2e}$ at the point e are as follows:

$$E_{1e} = \sqrt{2}\, k\, \Delta\theta\, E_1\, e^{-j(\phi+\rho+\frac{\pi}{4})} \tag{41}$$

$$E_{2e} = \sqrt{2}\, k\, \Delta\theta\, E_2\, e^{-j(\phi+\rho+\frac{\pi}{4})}. \tag{42}$$

If the 180° phase difference plate 35 is set at an angle which meets the following expression:

$$\beta' = \beta + 22.5°, \tag{42}$$

then the components $E_{1f}$ and $E_{2f}$ at the point f are linearly polarized waves as indicated at 87 and 88 in FIG. 7 and have phases and amplitudes as indicated by the following expressions (43) and (44):

$$E_{1f} = 2k\Delta\theta E_1 e^{-j(\phi+\rho+\pi/4)} \tag{43}$$

$$E_{2f} = 2k\Delta\theta E_2 e^{-j(\phi+\rho+\pi/4)}. \tag{44}$$

With these signals subjected to wave separation by the polarization coupler 36 inclined 45° in such a manner as to satisfy the following expressions (45):

$$E_{XD} = \frac{1}{\sqrt{2}} (E_{1f} + E_{2f}) \quad (45)$$

$$E_{YD} = \frac{1}{\sqrt{2}} (E_{1f} - E_{2f}),$$

then $$X_{XD} e^{-j\frac{\pi}{4}} = k \Delta\theta \sqrt{E_1^2 + E_2^2} \cos\phi \quad (46)$$

$$-j k \Delta\theta \frac{1}{\sqrt{E_1^2 + E_2^2}} [(E_1^2 + E_1^2) \sin\phi - 2E_1E_2 \cos\phi]$$

$$E_{YD} e^{-j\frac{\pi}{4}} = \quad (47)$$

$$k \Delta\theta \frac{1}{\sqrt{E_1^2 + E_1^2}} [(E_1^2 + E_2^2) \cos\phi - 2E_1E_2 \sin\phi]$$

$$-j k \Delta\theta \sqrt{E_1^2 + E_2^2} \sin\phi .$$

That is, $\Delta X$ and $\Delta Y$ can be obtained by processing the expressions (36) and (37) with a signal which is obtained by applying E (the expression (24)) to a $(-\pi/4)$ phase shifting circuit.

In the above-described embodiment, the polarization conversion circuits for processing an arbitrarily polarized wave in the reference signal circuit are the 90° phase difference plate provided closer to the mode couplers and the 180° phase difference plate provided after the 90° phase difference plate. Even if the 180° phase difference plate is provided before the 90° phase difference plate as shown in FIG. 9, an arbitrarily polarized wave can be processed satisfactorily. The circuit of FIG. 9 is obtained by exchanging the positions of the 90° phase difference plate 4 and the 180° phase difference plate 5 in FIG. 3.

In the circuit of FIG. 9, the conditions for minimizing the signal reception level of $E_{YC}$ are as follows: If the set angles of the 90° phase difference plate 4 and the 180° phase difference plate 5 are represented by $\alpha''$ and $\beta''$, respectively, then the conditions for minimizing $E_{YC}$ are:

$$\alpha'' = \rho + 45° \quad (48)$$

$$\beta'' = \tfrac{1}{2}\tau + 90°. \quad (49)$$

From equations (49) and (23), $$\beta = \beta''. \quad (50)$$

Thus, the set angles of the 90° phase difference plate 34 and the 180° phase difference plate 53 in the error circuit in FIG. 3 are determined solely by $\beta$ in any of the above-described embodiments. Therefore, it is evident that the set angles of the plates 34 and 35 in FIG. 9 may be the same as those of the plates 34 and 35 in FIG. 3.

Furthermore, it is also evident that even if the components 50 and 36 in FIG. 9 are arranged as in FIG. 8, or even if the element 50 is eliminated and the components 34 and 35 are set as defined by the expressions (40) and (42), the same function is obtained.

In the above-described embodiments, each of the 90° phase difference plate 34 and the 180° phase difference plate 35 in the angular error circuit may have a rotational ratio of 1:1 or 1:2 with respect to the angle of rotation of the 180° phase difference plate in the reference signal circuit. This control can be readily carried out with a mechanical device such as a gear train or an electrical apparatus using a synchro and a motor. Furthermore, in the above-described embodiments, the phase lag surfaces of the 90° phase difference plate and the 180° phase difference plate are controlled by rotating them with motors. However, if phase difference plates using ferrite elements are employed, then the phase lag surfaces can be similarly controlled by electrical signals.

As is apparent from the above description, according to the invention, the 90° phase difference plate in the angular error signal circuit is set to a rotational ratio of 1:2 with respect to the angle of rotation of the 180° phase difference plate in the reference signal circuit, while the 180° phase difference plate in the angular error signal circuit is set to provide a ratio of 1:1 with respect to the angle of rotation of the 180° phase difference plate in the reference signal circuit. Therefore, the angular error detecting device of the invention can detect angular error signals with a high accuracy while effectively receiving and processing waves of any polarization. Accordingly, the device of the invention is suitable as an angular error detecting device which automatically tracks a rocket or a satellite the radio waves from which have large polarization variations.

In addition, the device of the invention can be effectively employed for a high frequency bands where the polarization is liable to be affected, for instance, by rain during proparation.

Figure 10:
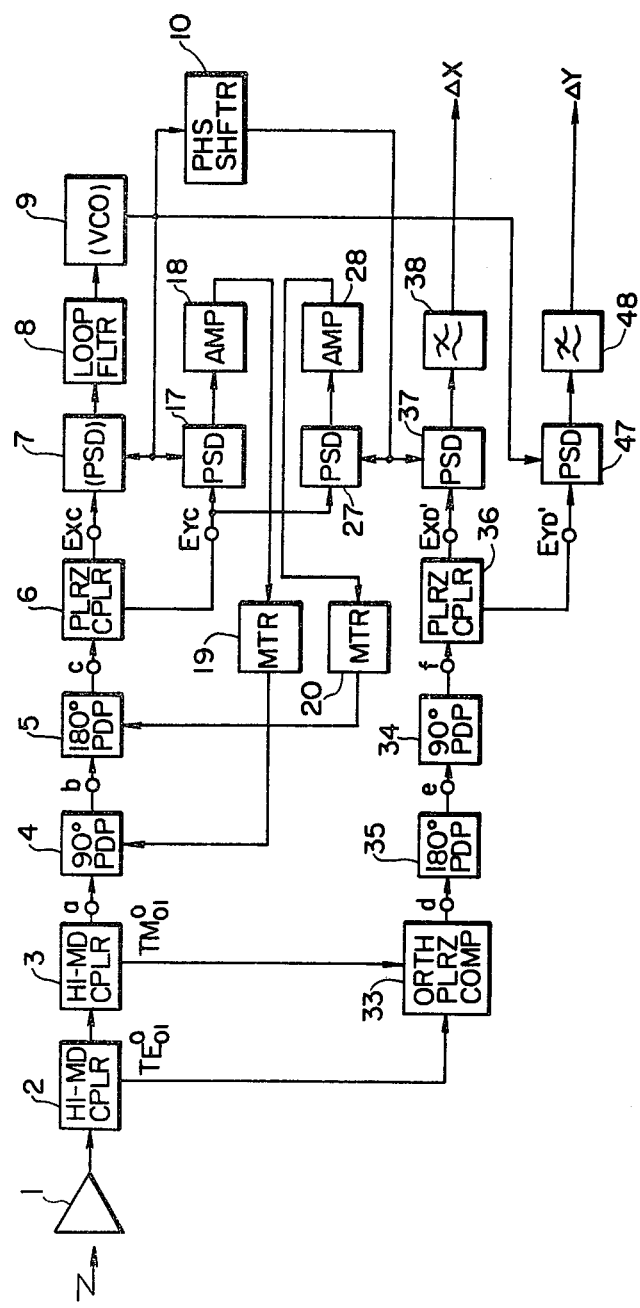

A further embodiment of the invention will be described with reference to FIG. 10. In this embodiment, the position of the 90° phase difference plate 34 and the 180° phase difference plate 35 are exchanged and the 90° phase difference plate 50 is omitted from the FIG. 3 embodiment.

In this case, if the set angle $\beta'$ of the 180° phase difference plate 35 is:

$$\beta' = \beta + 22.5°, \quad (51)$$

then at the point e, circularly polarized waves 83 and 84 which are in phase with each other at an angle of $\phi + \rho$ from the X-axis are obtained through conversion. As the waves 83 and 84 have passed through the 180° phase difference plate, they are rotated in a direction opposite to that of those at the point d.

Figure 11:
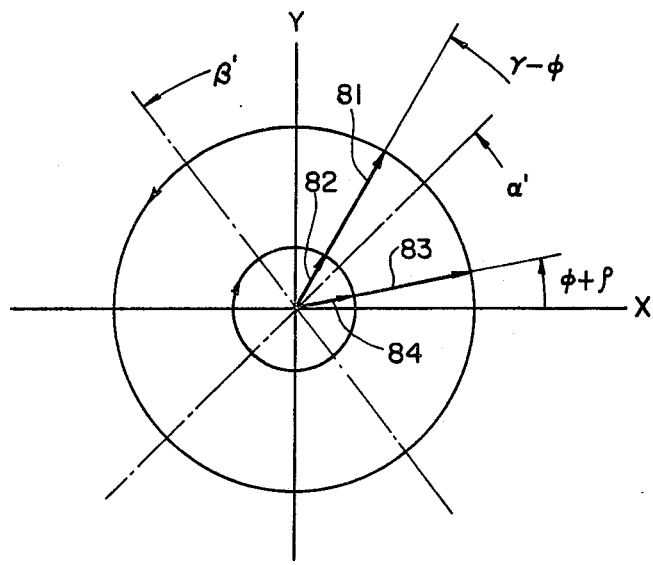
FIGS. 11 and 12 are explanatory diagrams showing relations in polarization between error signals in the embodiment of FIG. 10.

That is, the wave 81 is converted into the wave 83 which is a CW circularly polarized wave, while the wave 82 is converted into the wave 84 which is a CCW circularly polarized wave, as shown graphically in FIG. 11. If the waves 83 and 84 are represented by $E_{1e}$ and $E_{2e}$, then at the angle $\phi + \rho$ from the X-axis $$E_{1e} = k/\theta E_1$$

$$E_{2e} = k/\theta E_2. \quad (52)$$

Figure 12:
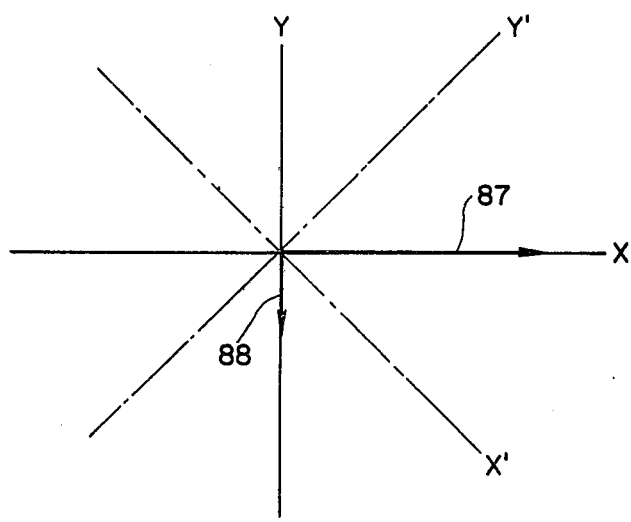

The waves 84 and 84 are applied to a 90° phase difference plate whose phase lag surface is at an angle $\alpha'$ $$\alpha' = 45°, \quad (53)$$

then at the point if the wave 83 is converted into a linearly polarized wave $E_{1f}$ as indicated at 87 in FIG. 12, and the wave 84 is converted into a linearly polarized wave $E_{2f}$ as indicated at 88. These linearly polarized waves $E_{1f}$ and $E_{2f}$ propagate along with the X-axis and the Y-axis, respectively, and have phases and amplitudes as indicated by the following expressions:

$$E_{1f} = \sqrt{2} \, E_{1e} \cdot e^{-j(\phi + \rho - \frac{\pi}{4})} \quad (54)$$

$$= \sqrt{2} \, k \, \Delta\theta \, E_1 \cdot e^{-j(\phi + \rho - \frac{\pi}{4})}$$

$$E_{2f} = \sqrt{2} \, E_{2e} \cdot e^{j(\phi + \rho - \frac{\pi}{4})}$$

$$= \sqrt{2} \, k \, \Delta\theta \, E_2 \cdot e^{j(\phi + \rho - \frac{\pi}{4})}.$$

If the polarization coupler 36 is inclined, for instance, by 45° to conduct wave separation in such a manner as to satisfy the following expressions, $$E_{XD} = \frac{1}{\sqrt{2}} (E_{1f} + E_{2f}) \quad (55)$$

$$E_{YD} = \frac{1}{\sqrt{2}} (E_{1f} - E_{2f}),$$

then $$E_{XD} \cdot e^{-j\frac{\pi}{4}} = k \, \Delta\theta \sqrt{E_1^2 + E_2^2} \, \cos\phi \quad (56)$$

$$-j \, k \, \Delta\theta \, \frac{1}{\sqrt{E_1^2 + E_2^2}} \, [(E_1^2 - E_2^2) \sin\phi - 2E_1 E_2 \cos\phi]$$

$$E_{TD} \cdot e^{-j\frac{\pi}{4}} = \quad (57)$$

$$k \, \Delta\theta \, \frac{1}{\sqrt{E_1^2 + E_2^2}} \, [(E_1^2 - E_2^2) \cos\phi - 2E_1 E_2 \sin\phi]$$

$$-j \, k \, \Delta\theta \sqrt{E_1^2 + E_2^2} \, \cos\phi.$$

In each of the expressions (56) and (57), the term $e^{-j\pi/4}$ is for a fixed phase of 45', and therefore it can be readily corrected. Thus, $$E_{XD} = k \, \Delta\theta \sqrt{E_1^2 - E_2^2} \, \cos\phi \quad (58)$$

$$-j \, k \, \Delta\theta \, \frac{1}{\sqrt{E_1^2 + E_2^2}} \, \sqrt{(E_1^2 + E_2^2) \sin\phi - 2E_1 E_2 \cos\phi}$$

$$E_{YD} = k \, \Delta\theta \, \frac{1}{\sqrt{E_1^2 + E_2^2}} \, \sqrt{(E_1^2 - E_2^2) \cos\phi - 2E_1 E_2 \sin\phi} \quad (59)$$

$$-j \, k \, \Delta\theta \sqrt{E_1^2 + E_2^2} \, \cos\phi.$$

When the real part of the expression (58) of $E_{XD}$ is detected by the PSD 37 and is applied to the low-pass-filter 38, then X as indicated by the following expression is obtained.

$$\Delta X = Re\left(\frac{E_{XD}}{E_\epsilon}\right) = \frac{k}{\sqrt{2}} \, \Delta\theta \cos\phi. \quad (60)$$

Similarly, when the real part of the expression (59) of $E_{YD}$ is detected by the PSD 47 and is applied to the low-pass filter 48, then Y as indicated by the following expression is obtained.

$$\Delta Y = Im\left(\frac{E_{YD}}{E_\epsilon}\right) = \frac{k}{\sqrt{2}} \, \Delta\theta \sin\phi. \quad (61)$$

That is, in the case of an antenna angular direction of $\phi$, the expression (60) describes a control singal indicating an amplitude proportional to cos $\phi$, while the expression (61) describes a control signal indicating an amplitude proportional to sin $\phi$.

What is claimed is:

1. An angular error detecting device in which reference signals are obtained from fundamental mode components in a waveguide which have passed a first set of at least one 180° phase difference plate and one 90° phase difference plate, phase lag surfaces of which are disposed so that a polarization loss of a unit adapted to receive waves from a target is minimized, angular error signals are obtained utilizing two higher mode components which are in orthogonal relation, and said angular error signals are subjected to synchronous detection by a local oscillator output synchronous with said reference signals thereby to detect two orthogonal angular errors, the improvement wherein a circuit for obtaining said angular error signals comprises:
   at least higher mode detector means for obtaining said two higher mode components which are in orthogonal relation;
   a circuit for combining said two higher mode components in such a manner that said two higher mode components are in orthogonal relation;
   a circuit having a second set of at least one 90° phase difference plate and one 180° phase difference plate which have rotatable phase lag surfaces and are cascade-connected, said 90° phase difference plate in said second set being provided on the side of said circuit for combining said two higher order components, said phase lag surface of said 90° phase difference plate in said second set being disposed in an angular ratio of 2:1 with respect to said phase lag surface of said 180° phase difference plate in said first set, and said phase lag surface of said 180° phase difference plate in said second set being disposed in an angular ratio of 1:1 with respect to said phase lag surface of said 180° phase difference plate in said first set;
   means for dividing an output of said 180° phase difference plate in said second set into first and second polarization components which are orthogonal to each other;
   means for synchronously detecting said first-polarization component with said local oscillator output synchronous with said reference signals to provide a first angular error output; and
   means for synchronously detecting said second polarization component with a signal different by 90° in phase from that in providing said first angular error output so as to provide a second angular error output which is orthogonal to said first angular error output.

2. An angular error detecting device in which reference signals are obtained from fundamental mode components in a waveguide which have passed at least one first 180° phase difference plate and one 90° phase difference plate, phase lag surfaces of which are disposed so that the polarization losses in reception of a unit adapted to receive a wave from a target is minimized, angular error signals are obtained by utilizing two higher mode components which are in orthogonal relation, and said angular error signals are subjected to synchronous detection with said reference signals thereby to detect two orthogonal angular errors, the improvement wherein a circuit for obtaining said angular error signals comprises;

- at least higher mode detector means for obtaining said two higher mode components which are in orthogonal relation; a circuit for combining said two higher mode components in such a manner that said two higher mode components are in orthogonal relation;
- at least on second 180° phase difference plate, a phase lag surface of said second 180° phase difference plate being disposed in an angular ratio of 1:1 with respect to said phase lag surface of said first 180° phase difference plate;
- means for dividing an output of said second 180° phase difference plate into first and second polarization components which are orthogonal to each other;
- means for synchronously detecting said first polarization component with said local oscillator output synchronous with said reference signals to provide a first angular error output; and
- means for synchronously detecting said second polarization component with a signal different by 90° in phase from that in providing said first angular error output so as to provide a second angular error output which is orthogonal to said first angular error output.

3. An angular error detecting device comprising: first and second higher mode couplers coupled in series with one another in an orthogonal relation; an adjustable 90° phase difference plate having an input coupled to an output of said second higher mode coupler; an adjustable 180° phase difference plate having an input coupled to an output of said first 90° phase difference plate; a first polarization coupler receiving an output of said first 180° phase difference plate for separating said output into a main polarization component and an orthogonal polarization component; a first phase detector receiving on a first input said main polarization component; a loop filter receiving an output of said first phase detector; a voltage controlled oscillator receiving an output of said loop filters, an output of said voltage controlled oscillator being coupled to a second input of said first phase detector; a second phase detector receiving on a first input said orthogonal polarization component and on a second input said output of said voltage controlled oscillator; an amplifier receiving an output of said second phase detector; a motor operated in response to an output of said amplifier to adjust said first 90° phase difference plate; a 90° phase shifter receiving said output of said voltage controlled oscillator; a third phase detector receiving on one input said orthogonal polarization component and on a second input an output of said 90° phase shifter; a second amplifier receiving an output of said third phase detector; a second motor operating in response to an output of said second amplifier for adjusting a position of said first 180° phase difference plate, wherein said first 90° phase difference plate and said first 180° phase difference plate are adjusted by said first and second motors, respectively, such that lagging surfaces of said first 90° phase difference plate and said 180° phase difference plate are adjusted so that said orthogonal polarization component is maintained at a minimum value; an orthogonal polarization composer receiving as inputs higher mode components from said first and second higher mode couplers; a second 90° phase difference plate and a second 180° phase difference plate coupled in series with one another; a second polarization coupler receiving an output from said series-coupled second 90° phase difference plate and said 180° phase difference plate, said second polarization coupler providing a wave separation of 45°; a fourth phase detector receiving on one input said output of said 90° phase shifter and on a second input a first output of said polarization coupler; a first low-pass filter receiving an output of said fourth phase detector for outputting an X-axis error signal; a fifth phase detector receiving on one input said output of said voltage controlled oscillator and on a second input a second output of said second polarization coupler; and a second low-pass filter receiving an output of said fifth phase detector for outputting a Y-axis error signal.

4. The angular error detecting device of claim 3 wherein said second 90° phase difference plate is arranged before said 180° phase difference plate.

5. The angular error detecting device of claim 3 wherein said second 180° phase difference plate is arranged before said second 90° phase difference plate.

6. The angular error detecting device of any of claims 3-5 further comprising a third 90° phase difference plate coupled between said series-connected second 90° phase difference plate and said 180° phase difference plate, and said second polarization coupler.

7. The angular error detecting device of any of claims 3-5 wherein said second 90° phase difference plate is set at an angle $\alpha' = 2\beta$ and said second 180° phase difference plate is set at an angle $\beta' = \beta + 22.5°$, where $$\beta = \frac{1}{2}\left[\gamma - 45° + \tan^{-1}\left(\frac{E_{max} - E_{min}}{E_{max} + E_{min}}\right)\right] + 90°.$$

wherein $E_{max}$ and $E_{min}$, respectively, represent a major axis electric field and a minor axis electric field of a received elliptically polarized wave and $\gamma$ is an inclination of a direction of said major axis electric field with respect to the X'-axis.

* * * * *